United States Patent
Bitterfeld et al.

(10) Patent No.: US 11,641,406 B2
(45) Date of Patent: May 2, 2023

(54) IDENTIFYING APPLICATIONS WITH MACHINE LEARNING

(71) Applicant: ServiceNow, Inc., Santa Clara, CA (US)

(72) Inventors: Robert Bitterfeld, Petach Tikva (IL); Asaf Garty, Sdei Hemed (IL); Aviya Aron, Shafir (IL); Boris Erblat, Tel Aviv (IL); Hail Tal, Kohav Yair (IL); Bary Solomon, Petah Tikva (IL)

(73) Assignee: ServiceNow, Inc., Santa Clara, CA (US)

( * ) Notice: Subject to any disclaimer, the term of this patent is extended or adjusted under 35 U.S.C. 154(b) by 841 days.

(21) Appl. No.: 16/163,204

(22) Filed: Oct. 17, 2018

(65) Prior Publication Data
US 2020/0128104 A1    Apr. 23, 2020

(51) Int. Cl.
*H04L 67/00* (2022.01)
*G06N 20/00* (2019.01)
*H04L 67/06* (2022.01)

(52) U.S. Cl.
CPC .............. *H04L 67/34* (2013.01); *G06N 20/00* (2019.01); *H04L 67/06* (2013.01)

(58) Field of Classification Search
CPC ......... H04L 67/34; H04L 67/06; G06N 20/00; G06N 5/00–20/20; G06F 16/906
See application file for complete search history.

(56) References Cited

U.S. PATENT DOCUMENTS

| | | |
|---|---|---|
| 5,978,594 A | 11/1999 | Bonnell |
| 6,321,229 B1 | 11/2001 | Goldman |
| 6,799,189 B2 | 9/2004 | Huxoll |
| 6,816,898 B1 | 11/2004 | Scarpelli |
| 6,895,586 B1 | 5/2005 | Brasher |
| 7,020,706 B2 | 3/2006 | Cates |
| 7,027,411 B1 | 4/2006 | Pulsipher |

(Continued)

OTHER PUBLICATIONS

L. K. Shar, L. C. Briand and H. B. K. Tan, "Web Application Vulnerability Prediction Using Hybrid Program Analysis and Machine Learning," in IEEE Transactions on Dependable and Secure Computing, vol. 12, No. 6, pp. 688-707, Nov.-Dec. 1, 2015, doi: 10.1109/TDSC.2014.2373377. (Year: 2015).*

(Continued)

*Primary Examiner* — Mohamed A. Wasel
(74) *Attorney, Agent, or Firm* — Fletcher Yoder PC

(57) ABSTRACT

A computing system includes a database and a discovery application that initiates discovery of software applications within a managed network by probing the computing devices for applications installed thereon. The discovery application executes discovery patterns in an attempt to classify a discovered application and determines that the discovered application is unclassified after executing the discovery patterns. In response to determining that the discovered application is unclassified, the discovery application (i) generates a configuration item representing the discovered application without classification and (ii) selects a characteristic file containing attributes of the discovered application. The discovery application provides the characteristic file to a machine learning (ML) classifier trained using a plurality of characteristic files. The discovery application receives, from the ML classifier, a classification of the discovered application, modifies the configuration item to include the classification of the discovered application, and stores, in the database, the configuration item as modified.

20 Claims, 10 Drawing Sheets

(56) References Cited

U.S. PATENT DOCUMENTS

| | | | |
|---|---|---|---|
| 7,392,300 B2 | 6/2008 | Anantharangachar | |
| 7,617,073 B2 | 11/2009 | Trinon | |
| 7,685,167 B2 | 3/2010 | Mueller | |
| 7,877,783 B1 | 1/2011 | Cline | |
| 7,933,927 B2 | 4/2011 | Dee | |
| 7,941,506 B2 | 5/2011 | Bonal | |
| 7,945,860 B2 | 5/2011 | Vambenepe | |
| 8,082,222 B2 | 12/2011 | Rangarajan | |
| 8,196,131 B1* | 6/2012 | von Behren | G06Q 20/3563 |
| | | | 717/168 |
| 8,346,752 B2 | 1/2013 | Sirota | |
| 8,380,645 B2 | 2/2013 | Kowalski | |
| 8,554,750 B2 | 10/2013 | Rangaranjan | |
| 8,646,093 B2 | 2/2014 | Myers | |
| 8,683,032 B2 | 3/2014 | Spinelli | |
| 8,745,040 B2 | 6/2014 | Kowalski | |
| 8,812,539 B2 | 8/2014 | Milousheff | |
| 8,818,994 B2 | 8/2014 | Kowalski | |
| 8,907,988 B2 | 12/2014 | Poston | |
| 9,015,188 B2 | 4/2015 | Behne | |
| 9,037,536 B2 | 5/2015 | Vos | |
| 9,065,783 B2 | 6/2015 | Ding | |
| 9,111,219 B1* | 8/2015 | Mohla | G06N 20/00 |
| 9,122,552 B2 | 9/2015 | Whitney | |
| 9,137,115 B2 | 9/2015 | Mayfield | |
| 9,152,694 B1 | 10/2015 | Padidar et al. | |
| 9,177,146 B1* | 11/2015 | Lee | G06F 21/566 |
| 9,261,372 B2 | 2/2016 | Cline | |
| 9,323,801 B2 | 4/2016 | Morozov | |
| 9,349,002 B1* | 5/2016 | Zhang | G06F 21/564 |
| 9,412,084 B2 | 9/2016 | Kowalski | |
| 9,467,344 B2 | 10/2016 | Gere | |
| 9,534,903 B2 | 1/2017 | Cline | |
| 9,535,737 B2 | 1/2017 | Joy | |
| 9,613,070 B2 | 4/2017 | Kumar | |
| 9,631,934 B2 | 4/2017 | Cline | |
| 9,659,051 B2 | 5/2017 | Hutchins | |
| 9,792,387 B2 | 10/2017 | George | |
| 9,852,165 B2 | 12/2017 | Morozov | |
| 9,967,162 B2 | 5/2018 | Spinell | |
| 10,002,203 B2 | 6/2018 | George | |
| 10,235,527 B1* | 3/2019 | Dalessio | G06F 16/2379 |
| 10,332,508 B1* | 6/2019 | Hoffmeister | G06N 3/084 |
| 10,388,274 B1* | 8/2019 | Hoffmeister | G06F 16/24522 |
| 10,425,471 B2* | 9/2019 | Chan | H04L 67/1097 |
| 10,491,632 B1* | 11/2019 | Natarajan | H04L 63/105 |
| 11,461,673 B2* | 10/2022 | Bitterfeld | G06N 20/20 |
| 2004/0122785 A1* | 6/2004 | Brown | G06N 3/105 |
| | | | 706/16 |
| 2004/0268303 A1* | 12/2004 | Abe | G06F 8/74 |
| | | | 717/108 |
| 2007/0022091 A1* | 1/2007 | Styles | G06F 21/6227 |
| 2008/0133438 A1* | 6/2008 | Aggarwal | G06N 20/00 |
| | | | 706/20 |
| 2009/0282391 A1* | 11/2009 | Gutierrez | G06F 8/70 |
| | | | 717/128 |
| 2010/0082400 A1* | 4/2010 | Bagherjeiran | G06Q 30/02 |
| | | | 705/14.47 |
| 2010/0082513 A1* | 4/2010 | Liu | G06N 20/00 |
| | | | 706/46 |
| 2010/0100615 A1* | 4/2010 | Lee | G06Q 30/0276 |
| | | | 709/223 |
| 2011/0231361 A1* | 9/2011 | Patchava | G06F 21/577 |
| | | | 707/602 |
| 2012/0008838 A1* | 1/2012 | Guyon | G06T 7/62 |
| | | | 382/128 |
| 2012/0203880 A1* | 8/2012 | Kluyt | G06F 9/54 |
| | | | 709/223 |
| 2012/0260141 A1* | 10/2012 | Bhagwan | H04L 41/0636 |
| | | | 714/732 |
| 2013/0291111 A1* | 10/2013 | Zhou | G06F 21/563 |
| | | | 726/23 |
| 2013/0303159 A1* | 11/2013 | Gathala | H04W 24/00 |
| | | | 455/425 |
| 2013/0347094 A1* | 12/2013 | Bettini | G06F 21/577 |
| | | | 726/11 |
| 2014/0113588 A1* | 4/2014 | Chekina | G06N 20/00 |
| | | | 455/410 |
| 2014/0188781 A1* | 7/2014 | Fawaz | G06N 5/025 |
| | | | 706/59 |
| 2015/0033341 A1* | 1/2015 | Schmidtler | H04L 63/14 |
| | | | 726/23 |
| 2015/0095725 A1* | 4/2015 | Pierce | G06F 3/0488 |
| | | | 714/57 |
| 2015/0112962 A1* | 4/2015 | Simhon | G06N 7/005 |
| | | | 707/709 |
| 2015/0134810 A1* | 5/2015 | Rosewell | H04L 67/303 |
| | | | 709/224 |
| 2015/0161386 A1* | 6/2015 | Gupta | G06N 5/043 |
| | | | 726/23 |
| 2015/0213365 A1* | 7/2015 | Ideses | H04L 67/125 |
| | | | 706/12 |
| 2015/0213376 A1* | 7/2015 | Ideses | G06N 20/00 |
| | | | 706/12 |
| 2015/0324686 A1* | 11/2015 | Julian | G06N 20/00 |
| | | | 706/25 |
| 2015/0347203 A1* | 12/2015 | Yang | G06F 9/5094 |
| | | | 719/318 |
| 2015/0356451 A1* | 12/2015 | Gupta | G06N 20/00 |
| | | | 706/52 |
| 2015/0356462 A1* | 12/2015 | Fawaz | G06N 5/043 |
| | | | 706/12 |
| 2016/0021604 A1* | 1/2016 | Weksler | H04L 12/5692 |
| | | | 370/328 |
| 2016/0077818 A1* | 3/2016 | Nos | G06F 9/547 |
| | | | 717/177 |
| 2016/0078347 A1* | 3/2016 | Salajegheh | G06F 11/3017 |
| | | | 706/12 |
| 2016/0078362 A1* | 3/2016 | Christodorescu | G06F 21/554 |
| | | | 706/12 |
| 2016/0149943 A1* | 5/2016 | Kaloroumakis | H04L 63/1416 |
| | | | 726/23 |
| 2016/0154960 A1* | 6/2016 | Sharma | G06N 20/00 |
| | | | 726/25 |
| 2016/0156646 A1* | 6/2016 | Hsueh | G06N 7/005 |
| | | | 726/1 |
| 2016/0253498 A1* | 9/2016 | Valencia | G06F 21/577 |
| | | | 726/23 |
| 2016/0285897 A1* | 9/2016 | Gantman | G06F 21/552 |
| 2016/0337390 A1* | 11/2016 | Sridhara | H04W 12/1208 |
| 2016/0352778 A1* | 12/2016 | Chari | G06N 20/00 |
| 2016/0379136 A1* | 12/2016 | Chen | G06F 21/566 |
| | | | 706/12 |
| 2017/0024660 A1* | 1/2017 | Chen | H04L 63/1433 |
| 2017/0046510 A1* | 2/2017 | Chen | G06F 21/552 |
| 2017/0083825 A1* | 3/2017 | Battersby | G06N 20/10 |
| 2017/0177318 A1* | 6/2017 | Mark | G06F 3/0482 |
| 2017/0177319 A1* | 6/2017 | Mark | G06F 8/71 |
| 2017/0345109 A1* | 11/2017 | Cejnar | G09B 7/00 |
| 2018/0004497 A1* | 1/2018 | Ramachandran | G06F 11/3438 |
| 2018/0024859 A1* | 1/2018 | Doshi | G06F 9/5044 |
| | | | 718/104 |
| 2018/0025289 A1* | 1/2018 | Doshi | G06F 9/50 |
| | | | 706/12 |
| 2018/0137282 A1* | 5/2018 | Rasanen | G06F 21/562 |
| 2018/0137411 A1* | 5/2018 | Jayaraman | G06F 17/11 |
| 2018/0183660 A1* | 6/2018 | Byers | H04L 41/147 |
| 2018/0183815 A1* | 6/2018 | Enfinger | H04L 63/145 |
| 2018/0203998 A1 | 7/2018 | Maisel et al. | |
| 2018/0204061 A1* | 7/2018 | Antol | H04L 67/22 |
| 2018/0295494 A1* | 10/2018 | Meau | H04W 8/005 |
| 2018/0300623 A1* | 10/2018 | Zhang | G06N 7/005 |
| 2019/0007434 A1* | 1/2019 | McLane | G06N 3/0454 |
| 2019/0098035 A1* | 3/2019 | Periaswamy | G06N 20/00 |
| 2019/0108353 A1* | 4/2019 | Sadeh | G06F 21/604 |
| 2019/0108443 A1* | 4/2019 | Dwarakanath | G06N 20/10 |
| 2019/0171816 A1* | 6/2019 | Copty | G06F 21/566 |
| 2019/0213326 A1* | 7/2019 | Dykes | G06N 20/00 |
| 2019/0236273 A1* | 8/2019 | Saxe | G06F 21/56 |
| 2019/0245754 A1* | 8/2019 | Greene, Jr. | G06N 3/084 |
| 2019/0273754 A1* | 9/2019 | Ting | H04L 63/1425 |

(56) References Cited

U.S. PATENT DOCUMENTS

| | | | | |
|---|---|---|---|---|
| 2019/0340512 A1* | 11/2019 | Vidal | .................. | G06F 11/3688 |
| 2019/0384699 A1* | 12/2019 | Arbon | .................... | G06N 3/006 |
| 2019/0394206 A1* | 12/2019 | Zezza | ..................... | H04L 41/28 |
| 2020/0012509 A1* | 1/2020 | Khan | .................. | G06F 9/45533 |
| 2020/0042704 A1* | 2/2020 | Haim | ................ | G06K 9/00523 |
| 2020/0044938 A1* | 2/2020 | Dias | .................... | H04L 41/5019 |
| 2020/0053155 A1* | 2/2020 | Shi | .......................... | H04L 67/12 |
| 2020/0081892 A1* | 3/2020 | Ye | ..................... | G06F 16/24573 |
| 2020/0125896 A1* | 4/2020 | Hsu | ..................... | H04L 63/1425 |
| 2020/0128104 A1* | 4/2020 | Bitterfeld | ............... | H04L 67/34 |
| 2020/0153863 A1* | 5/2020 | Wiener | ............... | H04L 63/1433 |
| 2020/0241917 A1* | 7/2020 | Chen | .................... | G06F 9/3836 |

OTHER PUBLICATIONS

Khalid, Muhammad Noman, et al. "Predicting Web vulnerabilities in Web applications based on machine learning." International Conference on Intelligent Technologies and Applications. Springer, Singapore, 2018. (Year: 2018).*

R. Komiya, I. Paik and M. Hisada, "Classification of malicious web code by machine learning," 2011 3rd International Conference on Awareness Science and Technology (iCAST), Dalian, 2011, pp. 406-411, doi: 10.1109/ICAwST.2011.6163109. (Year: 2011).*

Hou, Yung-Tsung, et al. "Malicious web content detection by machine learning." Expert Systems with Applications 37.1 (2010): 55-60. (Year: 2010).*

S. Krishnaveni and K. Sathiyakumari, "SpiderNet: An interaction tool for predicting malicious web pages," International Conference on Information Communication and Embedded Systems (ICICES2014), Chennai, 2014, pp. 1-6, doi: 10.1109/ICICES.2014.7033878. (Year: 2014).*

Extended European Search Report for European Patent Application No. 19203289.4, dated Feb. 13, 2020, 9 pgs.

Extended European Search Report for European Patent Application No. 21201239.7 dated Jan. 14, 2022, 9 pgs.

* cited by examiner

IDENTIFYING APPLICATIONS WITH MACHINE LEARNING

BACKGROUND

A computer network may include therein various interconnected computing devices and software applications, each of which may be expressed by one or more configuration items. Managing the network may involve discovering and organizing these configuration items into a representation or map that allows the state of the network to be visualized. Visualization, in turn, allows the network and its contents to be adjusted to meet various needs of an enterprise. However, when performed manually, discovering and organizing the configuration items is a time consuming task due to the multitude of configuration items present in many computer networks. Accordingly, discovery and mapping of configuration items is often performed by automated software processes. Even these software processes, however, may need to be periodically revised or updated as new types or versions of computing devices and software applications are added into the computer network.

SUMMARY

Discovery and mapping of configurations items, such as devices, applications, and the relationships therebetween, within a managed computer network may involve using discovery patterns. These discovery patterns may define rules and sequences of operations to be carried out by a discovery application to detect, classify, and gather information regarding the configuration items within the managed network. The discovery pattern for a given software application, for example, may take into account the software process names associated with this software application, the directory and file structures used by this software application, and/or the contents of various files included with the installation of this application. Thus, each respective software application sought to be discovered may be associated with a different discovery pattern that defines the specific rules and operations configured to discover the respective software application. Further, in some cases, different versions of a software application may also each necessitate a different discovery pattern.

The discovery patterns may be defined by a software developer or programmer based on where and how a given software application stores the information needed for detection and classification thereof. When the location or format of the information needed for detection and classification changes, the corresponding software pattern may need to be updated to match this change. When a large number of frequently-updated software applications is sought to be discovered, the process of developing the discovery patterns may become very time-intensive and, in some cases, unsustainable. Even when development of discovery patterns may be achievable within a target amount of time, there may be a delay between an update to the software application and generation of a corresponding update to the discovery pattern. Thus, in some circumstances, predefined discovery patterns may be unable, at least temporarily, to classify a software application discovered within a managed network.

Accordingly, machine learning (ML) classifiers may be used as a back-up, when classification using discovery patterns fails, as a redundancy in parallel with discovery patterns, or as a stand-alone approach independent of discovery patterns. Namely, when, after attempting to classify a discovered application using discovery patterns, the discovered application remains unclassified, an ML classifier may be selected to be used to classify the discovered application. Notably, the discovered application may remain unclassified due to, for example, a discovery pattern corresponding thereto not having been defined or the discovered application having changed such that the discovery pattern corresponding thereto is no longer able to obtain the information needed for classification. Rather than define or modify a discovery pattern for the discovered application, a process which could take several minutes or hours, the ML classifier may be used to provide a classification without additional delay. Notably, however, the ML classifier may also be used to classify the discovered application even when the discovered application has already been classified using a discovery pattern, thereby providing redundancy in the classification of discovered applications.

The ML classifier may be configured to classify applications based on one or more characteristic files. A characteristic file for the discovered application may identify various attributes, parameters, and properties according to which the discovered application operates and that provide information used to distinguish the discovered application from other software applications. The ML classifier may be trained using a plurality of different characteristic files corresponding to different software applications to classify discovered applications among a number of different categories. The categories may define, for example, a type of application, an application provider, an application name, a release version, and/or any add-ons or plug-ins activated with the application. However, the specificity of the categories may vary among different implementations.

Regardless of specificity of classification, the ML classifier may be configured to take as input the characteristic file of the discovered application and generate as output a classification of the discovered application. In some implementations, the ML classifier may also be configured to provide a confidence metric associated with the determined classifications. The discovery application may determine whether to utilize the determined classification based on the confidence metric exceeding a threshold value.

When the discovery application initially determines that the one or more discovery patterns did not classify the discovered application, the discovery application may generate a configuration item without classification to represent the discovered application. Without the ML classifier, this configuration item (without classification) would be stored in a database and possibly marked for later manual classification. The configuration item would thus represent a generic software application, providing little to no information about the software application actually discovered. With the ML classifier, however, the configuration item may be automatically modified to indicate the classification and, in some cases, the confidence metric. The modified configuration item may then be stored in the database to indicate the classification of the discovered application. Accordingly, the modified configuration item may be retrieved at a later time and be used to visualize a state of the managed network.

In some implementations, a different ML classifier may be selected depending on the attributes and parameters of the characteristic file. That is, rather than classifying all characteristic files using one ML classifier, a plurality of different ML classifiers may be used under different circumstances. For example, one ML classifier may be used to distinguish between different version of a given software product (e.g., MICROSOFT WORD® 2010 vs MICROSOFT WORD® 2013). The discovery application may be configured to determine that a characteristic file corresponds to MICROSOFT WORD® but may use the ML classifier to determine the version (e.g., release year) thereof.

Notably, although the ML classifier may primarily rely on the characteristic file to generate a classification, the ML classifier may, in some cases, be configured to take into account additional information in generating the classification. For example, the ML classifier may be configured to generate classifications based on additional attributes of software processes (e.g., working directory of a process, files opened by the process, command used to invoke the process, etc.) associated with the discovered application. Additionally, in some cases, the ML classifier may be configured to utilize files associated with other software applications that are related to the discovered application. For example, a web container application may be classified based on files related to software applications that are executing or executable within the web container.

Accordingly, a first example embodiment may involve a computing system that includes a database disposed within a computational instance of a remote network management platform. The computational instance is associated with a managed network and the managed network includes software applications installed on computing devices. The computing system also includes a discovery application configured to initiate discovery of the software applications within the managed network by probing the computing devices for applications configured to execute thereon. The discovery application may also be configured to execute one or more predetermined discovery patterns in an attempt to classify a discovered application of the software applications and determine that the discovered application is unclassified after executing the one or more predetermined discovery patterns. The discovery application may additionally be configured to, in response to determining that the discovered application is unclassified, (i) generate a configuration item representing the discovered application without classification and (ii) select, from within a directory corresponding to the discovered application, a characteristic file containing attributes of the discovered application. The discovery application may further be configured to provide the characteristic file to a machine learning (ML) classifier. The ML classifier has been trained using a plurality of characteristic files corresponding to different software applications to classify the different software applications among a plurality of predetermined categories. The discovery application may yet further be configured to receive, from the ML classifier, a classification of the discovered application, modify the configuration item to include the classification of the discovered application, and store, in the database, the configuration item as modified.

In a second example embodiment, a method may involve initiating, by a computing system associated with a remote network management platform that is associated with a managed network, discovery of software applications within the managed network by probing computing devices within the managed networks for application installed thereon. The method may also involve executing, by the computing system, one or more predetermined discovery patterns in an attempt to classify a discovered application of the software applications and determining, by the computing system, that the discovered application is unclassified after executing the one or more predetermined discovery patterns. The method may additionally involve, in response to determining that the discovered application is unclassified, (i) generating, by the computing system, a configuration item representing the discovered application without classification and (ii) selecting, by the computing system and from within a directory corresponding to the discovered application, a characteristic file containing attributes of the discovered application. The method may further involve providing, by the computing system, the characteristic file to a machine learning (ML) classifier. The ML classifier has been trained using a plurality of characteristic files corresponding to different software applications to classify software applications among a plurality of predetermined categories. The method may yet further involve receiving, by the computing system and from the ML classifier, a classification of the discovered application, modifying, by the computing system, the configuration item to include the classification of the discovered application, and storing, in a database disposed within the remote network management platform, the configuration item as modified.

In a third example embodiment, an article of manufacture may include a non-transitory computer-readable medium, having stored thereon program instructions that, upon execution by a computing system, cause the computing system to perform operations. The operation may include initiating discovery of software applications within a managed network that is associated with a remote network management platform by probing computing devices within the managed network for applications installed thereon. The operation may also include executing one or more predetermined discovery patterns in an attempt to classify a discovered application of the software applications and determining that the discovered application is unclassified after executing the one or more predetermined discovery patterns. The operation may additionally include, in response to determining that the discovered application is unclassified, (i) generating a configuration item representing the discovered application without classification and (ii) selecting, from within a directory corresponding to the discovered application, a characteristic file containing attributes of the discovered application. The operation may further include providing the characteristic file to a machine learning (ML) classifier. The ML classifier has been trained using a plurality of characteristic files corresponding to different software applications to classify software applications among a plurality of predetermined categories. The operation may yet further include receiving, from the ML classifier, a classification of the discovered application, modifying the configuration item to include the classification of the discovered application, and storing, in a database disposed within the remote network management platform, the configuration item as modified.

In a fourth example embodiment, a computing system may include at least one processor, as well as memory and program instructions. The program instructions may be stored in the memory, and upon execution by the at least one processor, cause the computing system to perform operations in accordance with the third example embodiment.

In a fifth example embodiment, a system may include means for initiating discovery of software applications within a managed network that is associated with a remote network management platform by probing computing devices within the managed network for applications installed thereon. The system may also include means for executing one or more predetermined discovery patterns in an attempt to classify a discovered application of the software applications. The system may additionally include means for determining that the discovered application is unclassified after executing the one or more predetermined discovery patterns. The system may yet additionally include means for, in response to determining that the discovered application is unclassified, (i) generating a configuration item representing the discovered application without classification and (ii) selecting, from within a directory corresponding to the discovered application, a characteristic file containing attributes of the discovered application. The system may further include means for providing the characteristic file to a machine learning (ML) classifier. The ML classifier has been trained using a plurality of characteristic files corresponding to different software applications to classify software applications among a plurality of predetermined categories. The system may yet further include means for receiving, from the ML classifier, a classification of the discovered application, means for modifying the configuration item to include the classification of the discovered application, and means for storing, in a database disposed within the remote network management platform, the configuration item as modified.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
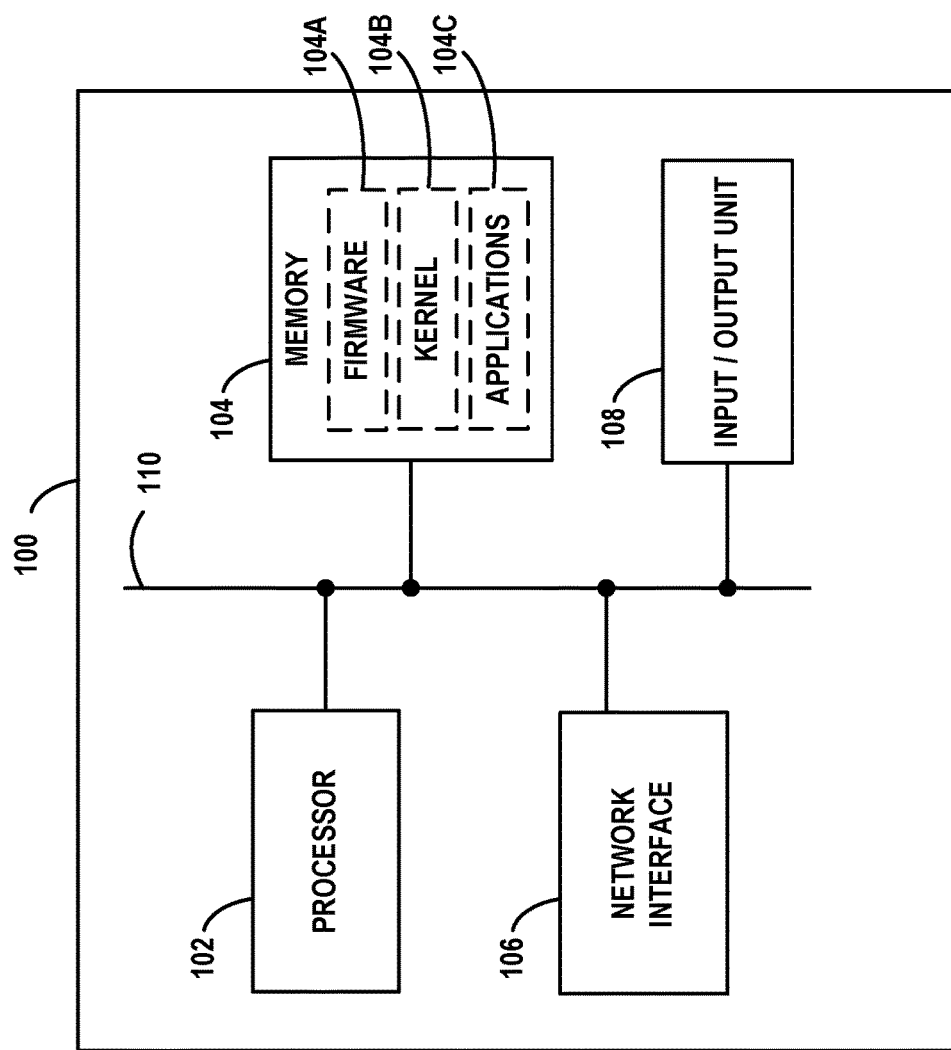
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/ output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with example computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
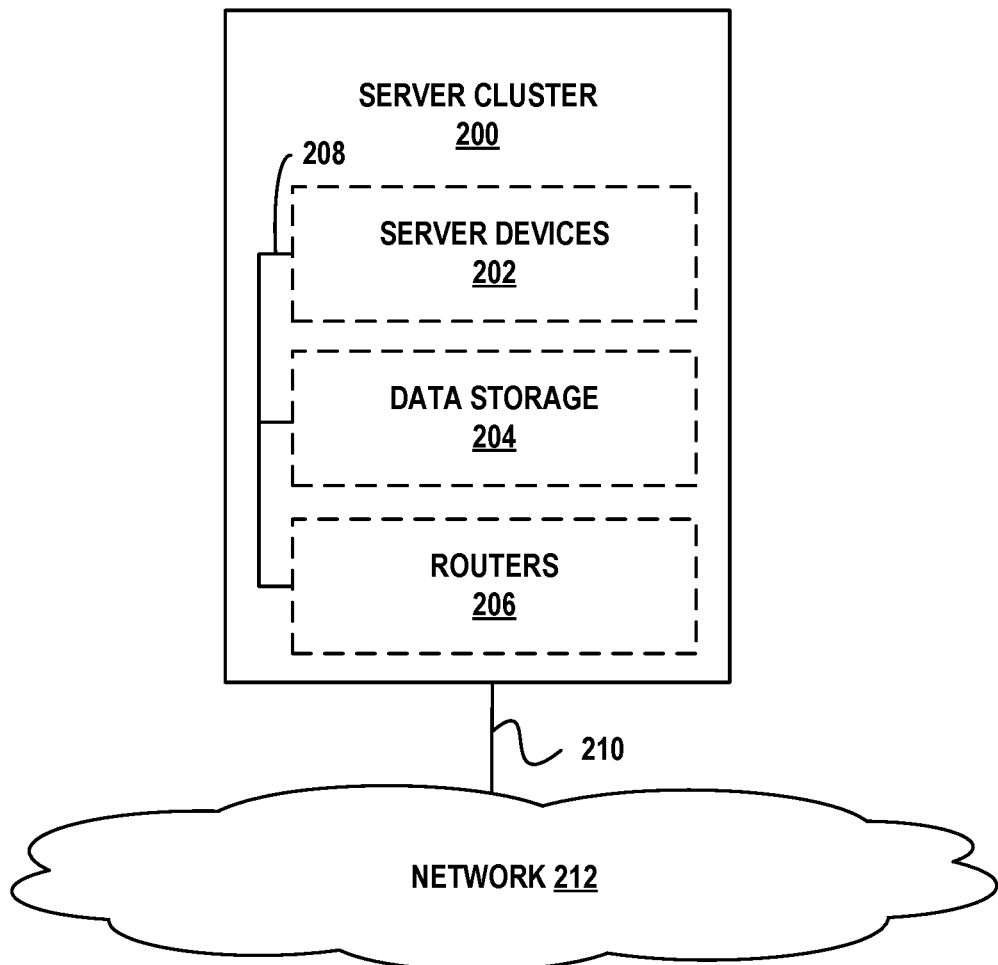
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. EXAMPLE REMOTE NETWORK MANAGEMENT ARCHITECTURE

Figure 3:
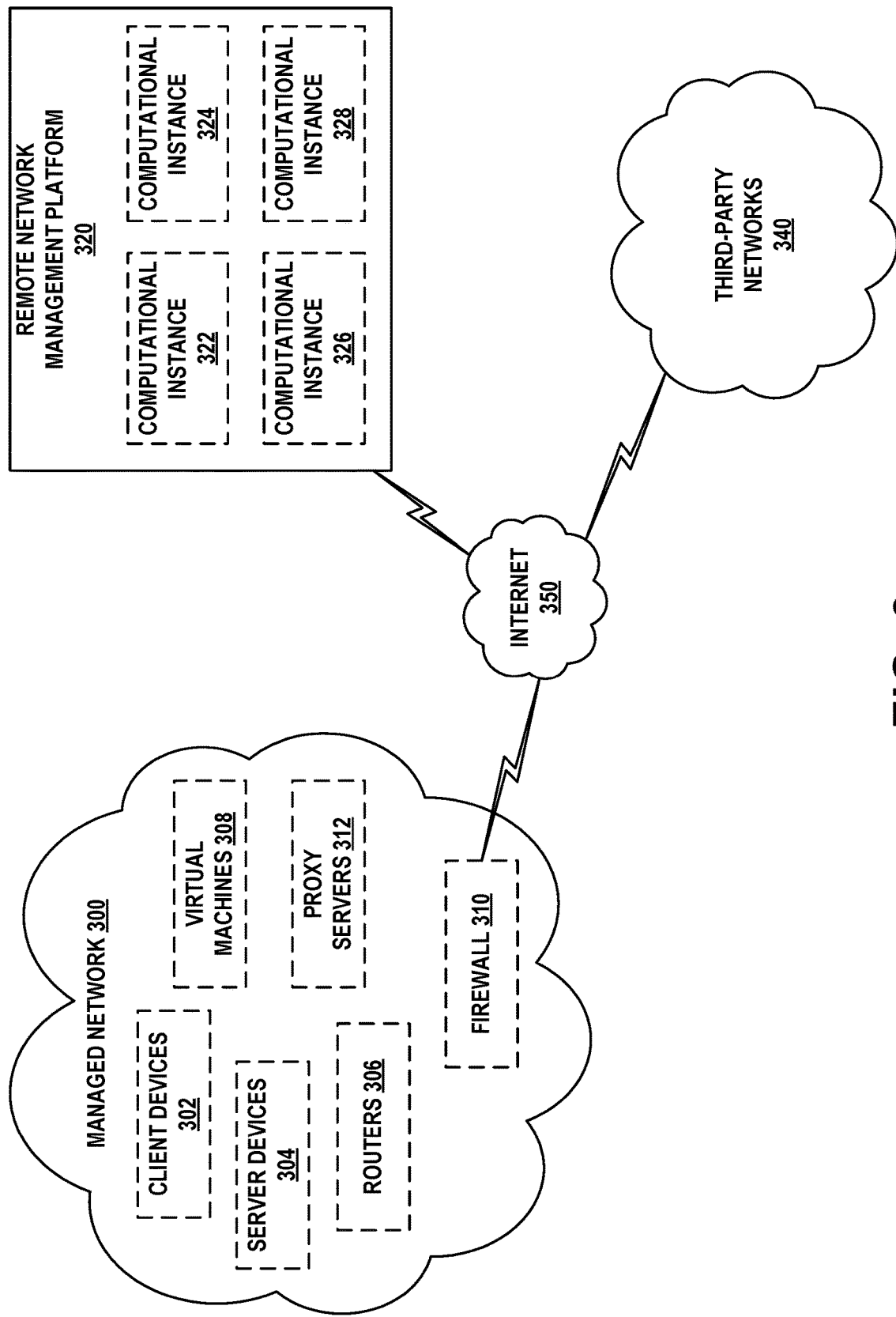
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include various client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows with one or more database tables).

The multi-instance architecture of remote network management platform 320 is in contrast to conventional multi-tenant architectures, over which multi-instance architectures have several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of physical or virtual servers and database devices. Such a central instance may serve as a repository for data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
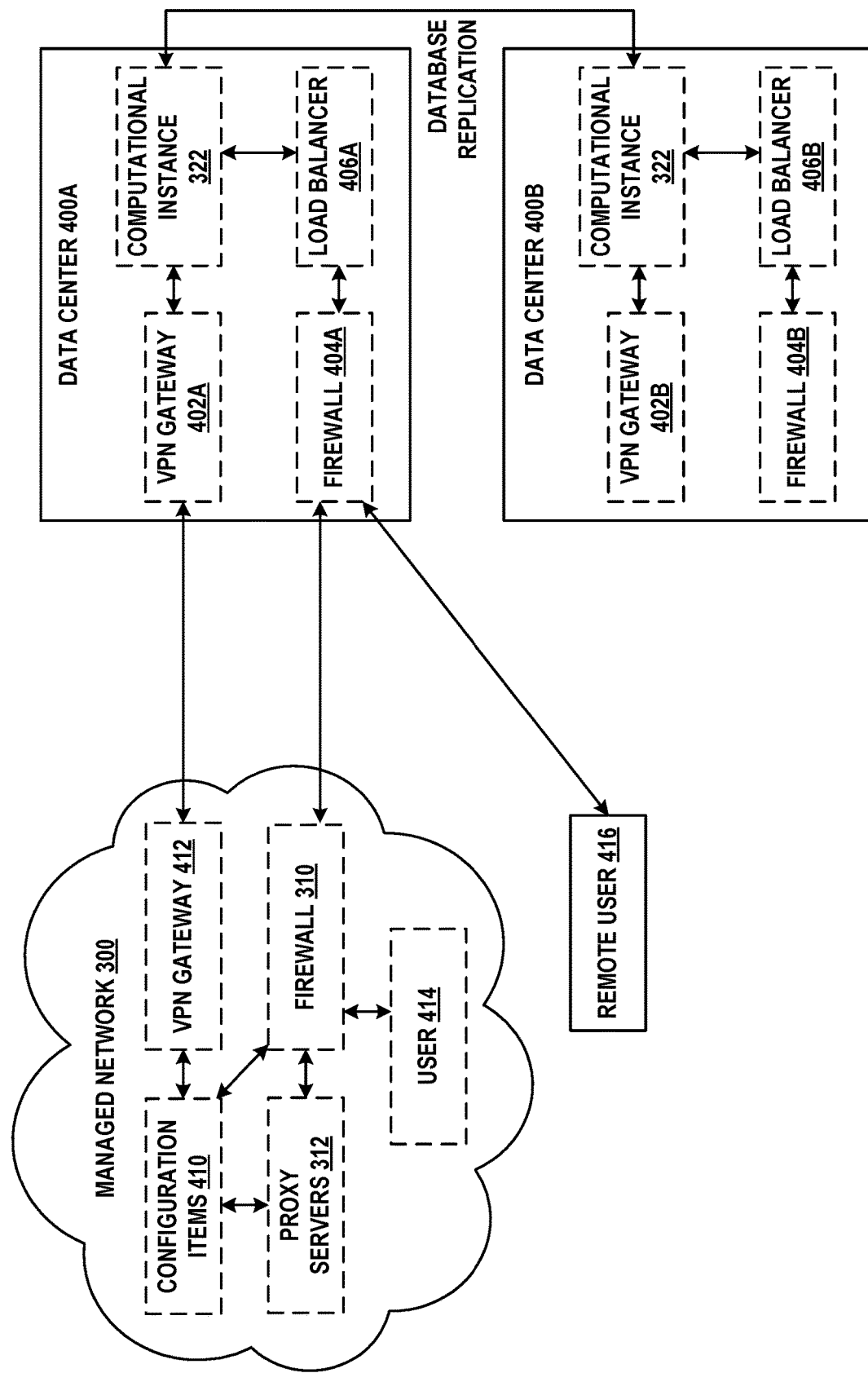
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
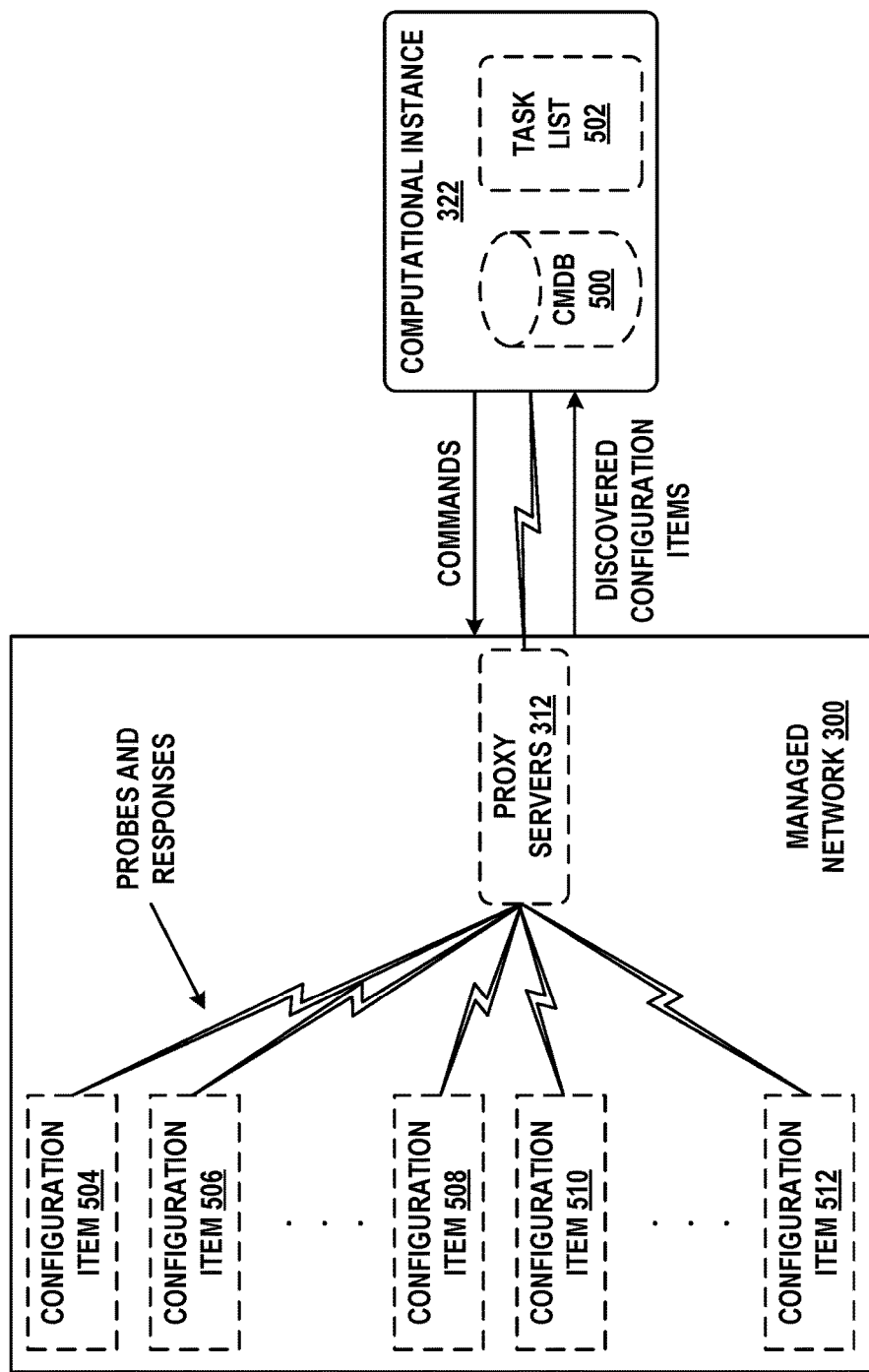
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address (es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
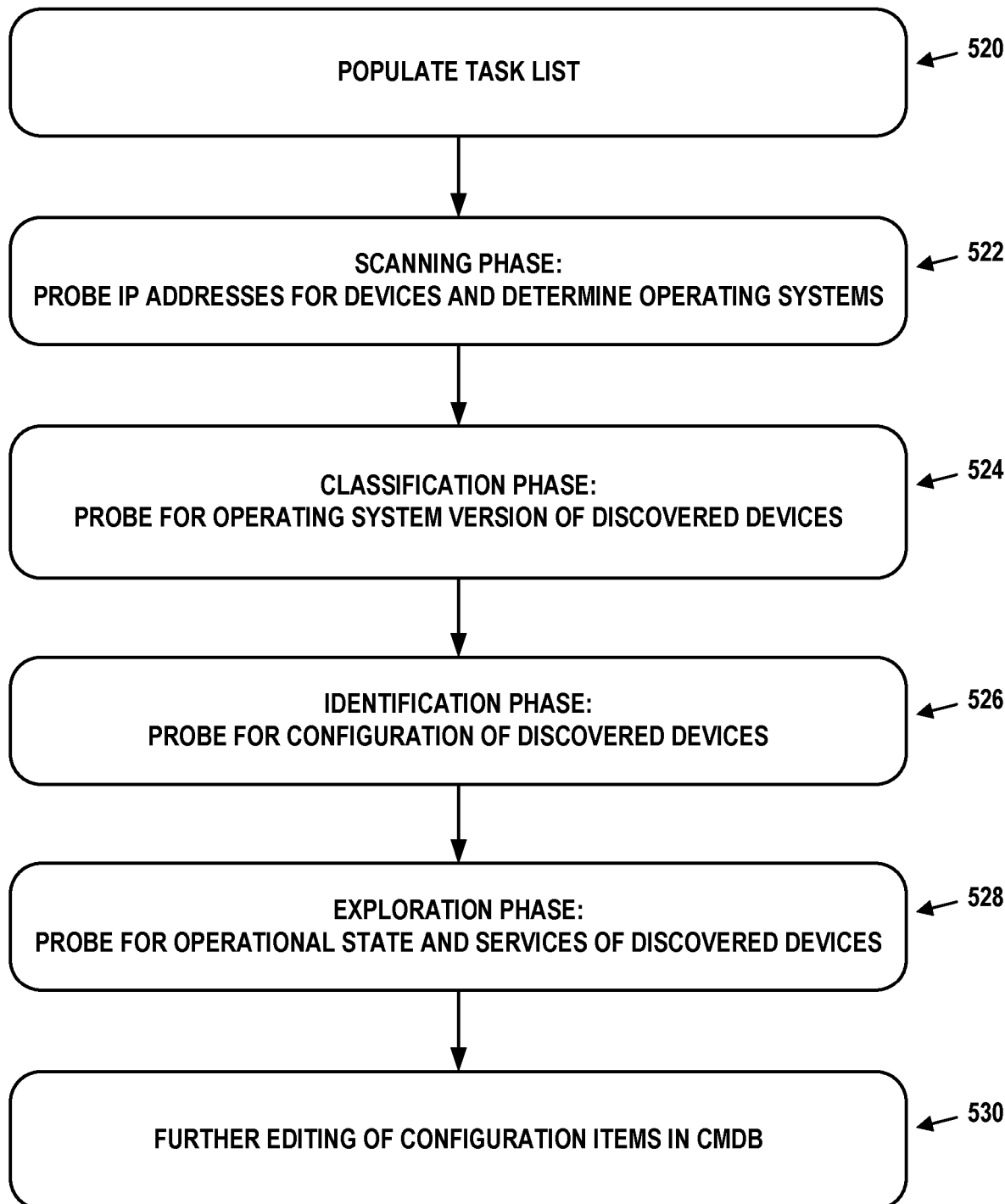
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. CMDB IDENTIFICATION RULES AND RECONCILIATION

A CMDB, such as CMDB 500, provides a repository of configuration items, and when properly provisioned, can take on a key role in higher-layer applications deployed within or involving a computational instance. These applications may relate to enterprise IT service management, operations management, asset management, configuration management, compliance, and so on.

For example, an IT service management application may use information in the CMDB to determine applications and services that may be impacted by a component (e.g., a server device) that has malfunctioned, crashed, or is heavily loaded. Likewise, an asset management application may use information in the CMDB to determine which hardware and/or software components are being used to support particular enterprise applications. As a consequence of the importance of the CMDB, it is desirable for the information stored therein to be accurate, consistent, and up to date.

A CMDB may be populated in various ways. As discussed above, a discovery procedure may automatically store information related to configuration items in the CMDB. However, a CMDB can also be populated, as a whole or in part, by manual entry, configuration files, and third-party data sources. Given that multiple data sources may be able to update the CMDB at any time, it is possible that one data source may overwrite entries of another data source. Also, two data sources may each create slightly different entries for the same configuration item, resulting in a CMDB containing duplicate data. When either of these occurrences takes place, they can cause the health and utility of the CMDB to be reduced.

In order to mitigate this situation, these data sources might not write configuration items directly to the CMDB. Instead, they may write to an identification and reconciliation application programming interface (API). This API may use a set of configurable identification rules that can be used to uniquely identify configuration items and determine whether and how they are written to the CMDB.

In general, an identification rule specifies a set of configuration item attributes that can be used for this unique identification. Identification rules may also have priorities so that rules with higher priorities are considered before rules with lower priorities. Additionally, a rule may be independent, in that the rule identifies configuration items independently of other configuration items. Alternatively, the rule may be dependent, in that the rule first uses a metadata rule to identify a dependent configuration item.

Metadata rules describe which other configuration items are contained within a particular configuration item, or the host on which a particular configuration item is deployed. For example, a network directory service configuration item may contain a domain controller configuration item, while a web server application configuration item may be hosted on a server device configuration item.

A goal of each identification rule is to use a combination of attributes that can unambiguously distinguish a configuration item from all other configuration items, and is expected not to change during the lifetime of the configuration item. Some possible attributes for an example server device may include serial number, location, operating system, operating system version, memory capacity, and so on. If a rule specifies attributes that do not uniquely identify the configuration item, then multiple components may be represented as the same configuration item in the CMDB. Also, if a rule specifies attributes that change for a particular configuration item, duplicate configuration items may be created.

Thus, when a data source provides information regarding a configuration item to the identification and reconciliation API, the API may attempt to match the information with one or more rules. If a match is found, the configuration item is written to the CMDB. If a match is not found, the configuration item may be held for further analysis.

Configuration item reconciliation procedures may be used to ensure that only authoritative data sources are allowed to overwrite configuration item data in the CMDB. This reconciliation may also be rules-based. For instance, a reconciliation rule may specify that a particular data source is authoritative for a particular configuration item type and set of attributes. Then, the identification and reconciliation API will only permit this authoritative data source to write to the particular configuration item, and writes from unauthorized data sources may be prevented. Thus, the authorized data source becomes the single source of truth regarding the particular configuration item. In some cases, an unauthorized data source may be allowed to write to a configuration item if it is creating the configuration item or the attributes to which it is writing are empty.

Additionally, multiple data sources may be authoritative for the same configuration item or attributes thereof. To avoid ambiguities, these data sources may be assigned precedences that are taken into account during the writing of configuration items. For example, a secondary authorized data source may be able to write to a configuration item's attribute until a primary authorized data source writes to this attribute. Afterward, further writes to the attribute by the secondary authorized data source may be prevented.

In some cases, duplicate configuration items may be automatically detected by reconciliation procedures or in another fashion. These configuration items may be flagged for manual de-duplication.

VI. EXAMPLE MACHINE LEARNING-BASED DISCOVERY OF APPLICATIONS

Discovery of computing devices, software applications, and relationships therebetween, among other configuration items within a managed network, may be based on predetermined discovery patterns, which may be herein referred to as rule-based discovery patterns. Each pattern may define a sequence of operations, probes, and/or rules that, when executed or adhered to, are configured to discover a particular computing device or software application. For example, a particular pattern may identify (i) names of software processes that are associated with a particular software application, (ii) directories associated with the particular software application, and/or (iii) files associated with the particular application, among other parameters. The patterns may additionally identify an order in which the software processes, directories, and/or files are to be detected and/or accessed. For example, parameters associated with a software process may be used to identify a directory of the software application to which the software process corresponds. This directory may, in turn, contain files that identify attributes of the software application and thereby allow the software application to be identified and/or disambiguated from other, similar software applications.

However, pattern-based discovery involves manually defining a corresponding pattern for each software application or group thereof sought to be discovered. Defining discovery patterns may be time-consuming when a large number of different applications are sought to be discovered. Additionally, the defined discovery patterns may need to be periodically altered or modified as different variants or versions of a software application are released. Thus, as the number of different available software applications and the rate at which these applications are updated increases, discovery patterns become more difficult to generate and maintain. Accordingly, an increasingly larger fraction of development time may need to be dedicated to maintaining existing functionality by generating and revising the discovery patterns rather than to developing new functionality or features of software products. When discovery patterns are not generated or updated at a sufficient rate, various software applications within a managed network may go undiscovered or may need to be discovered manually.

Figure 6:
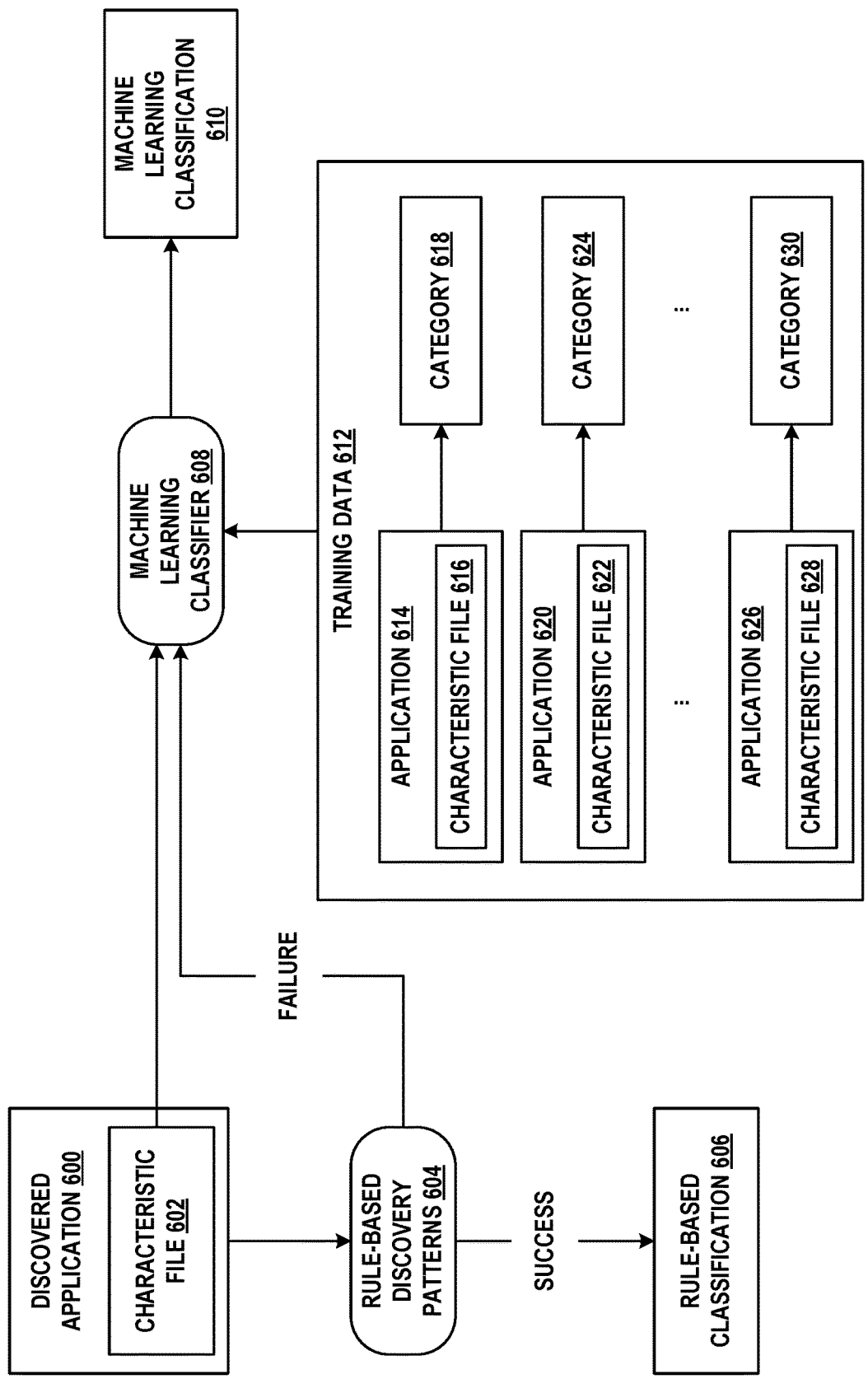
FIG. 6 depicts aspects of a discovery application, in accordance with example embodiments.

Accordingly, machine learning (ML) algorithms may be implemented alongside or instead of the discovery patterns to make up for the shortcomings recited above. Notably, machine learning classifiers may be easier to maintain than discovery patterns and may be more robust to changes or updates in a software application. FIG. 6 illustrates an example system that combines discovery patterns and a ML classifier to provide for more accurate discovery of a larger number of different software applications.

Discovered application 600 represents a software application within managed network 300 that may be discovered by a discovery application associated with or disposed in, for example, computational instance 322 of remote network management platform 320. Discovered application 600 may be associated with a characteristic file 602 or a group thereof. Characteristic file 602 may be a file that defines various attributes and/or parameters of discovered application 600. For example, characteristic file 602 may be a configuration file that defines a plurality of parameters (e.g., TCP port number, assigned SQL database, read-write-access privileges, etc.) according to which discovered application 600 is configured to operate. The name, type, contents, structure, location, and other properties of characteristic file 602 may vary between different software applications.

Detection and classification of discovered application 600 within managed network 300 may be facilitated by the discovery application. The discovery application may be stored and executed by a computational instance (e.g., computational instance 322) within remote network management platform 320, a computing device (e.g., proxy servers 312) within managed network 300, or a combination thereof. That is, in some implementations, functions of the discovery application may be distributed among different computing devices that form part of different computer networks.

Discovered application 600 may initially be detected (i.e., its presence on a computing device within managed network 300 may be detected) by the discovery application by probing computing devices within managed network 300 according to one or more rule-based discovery patterns. Such probes may instruct the computing devices to identify software processes executing thereon. The software processes and the parameters associated therewith may be used to detect and/or identify discovered application 600. Alternatively or additionally, discovered application 600 may be discovered even when it is not being executed by, for example, scanning a file system of the computing device on which discovered application 600 is installed for files associated with discovered application 600.

After an installation of discovered application 600 on a computing device is detected, the discovery application may execute further rule-based discovery patterns 604 on discovered application 600 in an attempt to classify discovered application 600. Specifically, various attributes and parameters of discovered application 600 determined from software processes and files associated with discovered application 600 may be used to select one or more corresponding rule-based discovery patterns for execution. In some cases, these attributes and parameters may unambiguously identify a predetermined rule-based discovery pattern to be used for discovered application 600. Alternatively, in some cases, multiple candidate rule-based discovery patterns may be executed in an attempt to find the discovery pattern that corresponds to and is able to classify discovered application 600. When one or more rule-based discovery patterns are predefined for discovered application 600, these rule-based discovery patterns may generate rule-based classification 606.

The specificity of the classification may vary among different implementations. In one example, the classification may specify a provider of the software application (e.g., MICROSOFT®) and a name of the software application (e.g., MICROSOFT WORD®). In another implementation, the classification may additionally specify, for example, a release version and any add-ons or plug-ins enabled or installed with the discovered application. Alternatively or additionally, the classification may be less specific, indicating a category or type of the discovered software application. For example, discovered application 600 may be classified as a game, a word processor, or a social media application, among other possibilities. Notably, although the process of assigning a category, class, or label to discovered application 600 is herein referred to as classification, the process may also be referred to as identification or recognition.

When attempts to classify discovered application 600 using rule-based discovery patterns fail, leaving discovered application 600 unclassified, machine learning (ML) classifier 608 may be used as a back-up for rule-based discovery. Attempts to classify discovered application 600 using rule-based discovery patterns may fail when, for example, a discovery pattern for discovered application 600 has not been implemented or predefined as part of the implementation of discovery application. Similarly, this classification may fail when the installation of discovered application 600 has been edited or modified such that it no longer matches the rule-based discovery patterns defined therefor. For example, discovered application 600 may be modified by the installation of an update or a new release version, or by modification to the directory structure, the file structure, or file contents of discovered application 600.

ML classifier 608 may be used to classify discovered application 600 based on characteristic file 602, which may be provided to ML classifier 608 by the discovery application in response to failure by rule-based discovery patterns to classify discovered application 600. However, in some implementations, ML classifier 608 may also be used to provide redundancy to the rule-based discovery patterns and may thus be used even when rule-based classification 606 is successfully generated. For example, a classification may be assigned to discovered application 600 when rule-based classification 606 and machine learning classification 610 are in agreement. When these two classifications differ, discovered application 600 may, for example, be flagged for manual review and classification, or may be assigned the category determined by one of the classification methods (e.g., ML classifier).

The type and contents of characteristic file 602 may correspond to the type and contents of files used to train the ML classifier. Namely, ML classifier 608 may be trained to classify different software applications among a plurality of different categories based on various characteristic files corresponding to these different software applications. By taking as input characteristic file 602, ML classifier 608 may be configured to, based on its prior training, determine a classification of discovered application 600. The specificity of the classifications generated by ML classifier 608 may vary as discussed above with respect to classifications using rule-based discovery pattern.

Specifically, training data 612 used to train ML classifier 608 may involve a plurality of application-category pairs. Namely, application 614, associated with characteristic file 616, may be mapped to category 618. Application 620, associated with characteristic file 622, may be mapped to category 624. Application 626, associated with characteristic file 628, may be mapped to category 630. Notably, each of characteristic files 602, 616, 622, and 628 may represent multiple files. Training of ML classifier 608 using training data 612 may be referred to as supervised learning because training data 612 contains both the inputs (i.e., characteristic files 616, 622, and 628) and the corresponding outputs (i.e., categories 618, 624, and 630). However, in some implementations (e.g., when applications and their characteristic files are not mapped to corresponding categories), ML classifier 608 may also be trained using various unsupervised learning techniques.

The mapping between applications and categories shown in training data 612 may, in some cases, be defined specifically for the purpose of training ML classifier 608. That is, a developer or a rule-based pattern may review various software applications, assign classifications thereto, and select characteristic files therefor. However, in other implementations, the mapping may be sourced from a plurality of different managed networks and/or databases corresponding thereto. Namely, as software applications within the different managed networks are discovered and classified, either manually or by way of rule-based discovery patterns, the information about these discovered applications may be added to training data 612. Thus, information that is already being generated and collected may be repurposed as training data, thereby providing a larger training data set than might be practicable to generate for the purpose of training alone.

ML classifier 608 may implement one or more machine learning algorithms in order to classify software applications based on their corresponding characteristic files. For example, ML classifier 608 may include a Naïve Bayes classifier (sometimes referred to as, e.g., simple Bayes or independent Bayes), decision trees (e.g., classification trees), random forests, support vector machines, and/or artificial neural networks, among other possibilities. ML classifier 608 may be trained using training data 612 before characteristic files of unclassified software applications are provided thereto for classification. Depending on the specific algorithm implemented by ML classifier 608, the size of training data 612 (e.g., the number of application-category pairs) may vary from tens, hundreds, thousands, or millions on entries.

Notably, due to its training based on a variety of characteristic files, ML classifier 608 may be configured to classify discovered application 600 even when the structure and/or contents of the file deviate from expectations that rule-based discovery patterns 604 rely on. For example, ML classifier 608 may be configured to recognize characteristic features of a given software application even where these characteristic features are presented in a different format than expected or where only a portion thereof are present. Thus, ML classifier 608 may be configured to generate machine learning classification 610 for discovered application 600 under conditions that might otherwise cause rule-based discovery patterns 604 to fail in classifying discovered application 600. Additionally, in some implementations, ML classifier 608 may serve the same function as a plurality of rule-based discovery patterns and may thus be used as a replacement therefor.

VII. EXAMPLE APPLICATION DISCOVERY PROCESS

Figure 7:
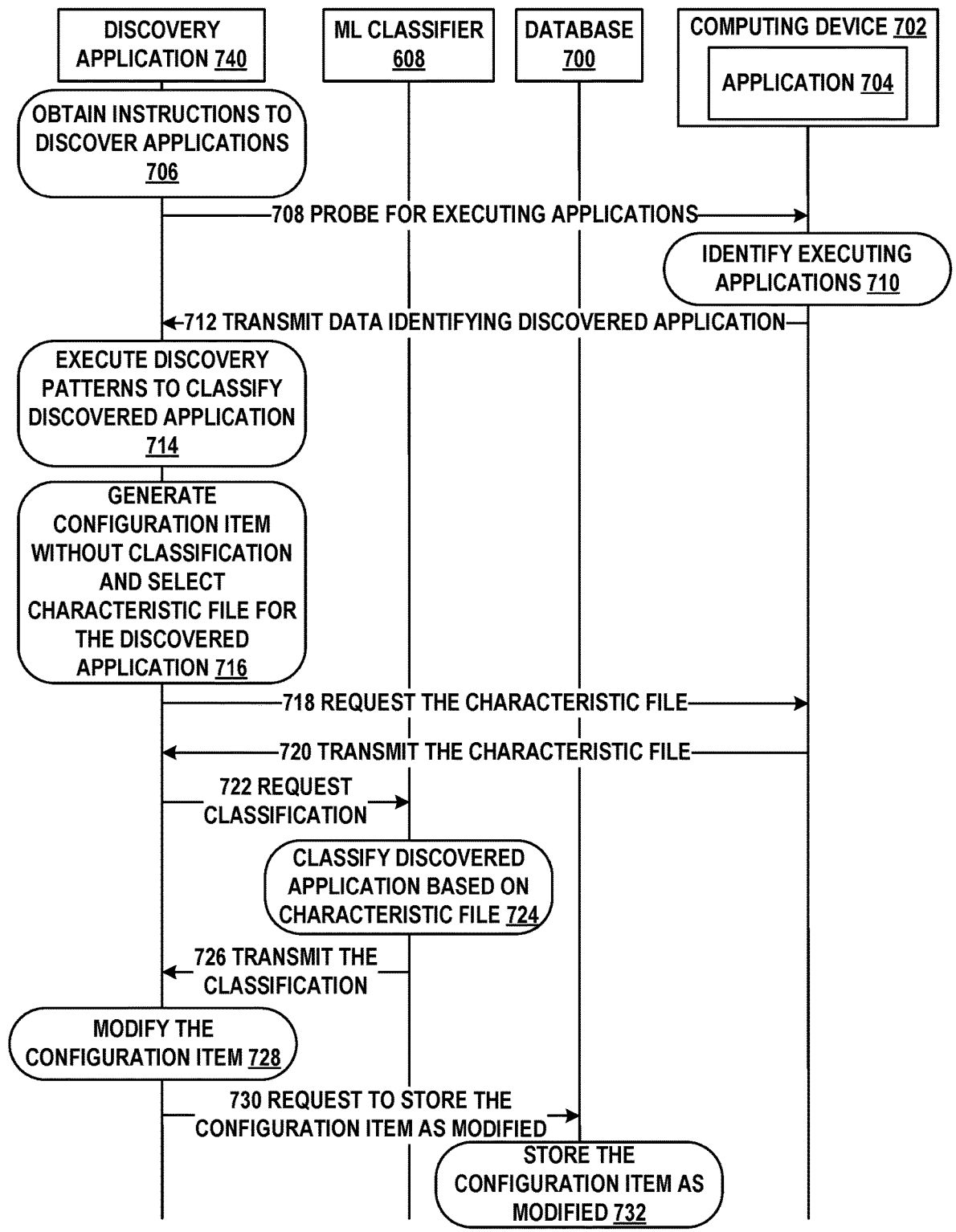
FIG. 7 is a message flow diagram, in accordance with example embodiments.

FIG. 7 illustrates a message flow diagram that details a discovery process that uses an ML classifier. Specifically, discovery application 740 may be used to coordinate the operations of ML classifier 608, database 700, and computing device 702 on which software application 704 is configured to execute. As mentioned before, aspects of discovery application 740 may be distributed among managed network 300 and remote network management platform 320. ML classifier 608 and/or database 700 may be disposed within a computational instance of remote network management platform 300, disposed on a computing device within managed network 300, or provided by a third-party network.

Discovery application 740 may initiate discovery of software applications installed on computing devices within managed network 300 by probing these computing devices, as indicated by arrow 708. Discovery may be initiated based on or in response to obtaining instructions to discover the software application from, for example, a computing device within managed network 300, as indicated by block 706. Probing the computing devices may involve transmitting thereto instructions configured to cause the computing devices to identify software processes, and thus application, executing thereon. Thus, in response to or based on the probes transmitted at arrow 708, computing device 702 may be configured to identify the applications executing thereon, as indicated by block 710. In some implementations, however, the probes transmitted at arrow 708 may also include to search for files or other indicia of applications that might not, at the time of probing, be executing on computing device 702, but that might nevertheless be installed and configured for execution thereon.

In response to or based on identifying the applications installed on and/or executing on computing device 702, computing device 702 may be configured to transmit, to discovery application 740, data identifying any discovered applications, as indicated by arrow 712. The data transmitted at arrow 712 may identify application 704 as one of the installed and/or executing applications. However, this data might not indicate the classification or identity of application 704. Thus, in response to or based on receiving the data at arrow 712, discovery application 740 may be configured to execute one or more rule-based discovery patterns in an attempt to classify application 704, as indicated by block 714.

When a rule-based discovery pattern for application 704 is predefined and usable to determine a classification of application 704, discovery application 740 may use this discovery pattern to classify application 704 (not shown). Discovery application 740 may also be configured to generate a configuration item for application 704 indicating the determined classification (not shown). On the other hand, when (i.e., based on or in response to), after executing one or more discovery patterns, application 704 remains unclassified, discovery application 740 may be configured to generate a configuration item without a classification for application 704, as indicated by block 716. In the absence of ML classifier 608, this configuration item without classification would be stored in database 700 to represent a "generic" software application whose identity, details, attributes, parameters, or other characteristics were not determined. The generic classification item might then be manually reviewed and modified to determine a corresponding classification.

Notably, however, when a large number of applications remain unclassified, manual classification may be impractical to carry out and/or keep up with over time as new applications are discovered. For example, when application 704 is not classified or otherwise identified, it may be difficult to map future re-discoveries of the same application back to the original configuration item generated therefor. Additionally, as application 704 is updated or modified, the manual classification may also need to be updated or modified, resulting in mappings being out-of-date with a current state of managed network 300.

Accordingly, based on or in response to determining that application 704 remains unclassified, discovery application 740 may be configured to select a characteristic file for the discovered application, as further indicated by block 716. The characteristic file may be selected so that application 704 may be classified by way of ML classifier 608. Selecting the characteristic file may involve selecting a particular directory corresponding on computing device 702 that corresponds to application 704. The particular directory may be a directory in which application 704 is installed, a directory in which application 704 accesses one or more files, or a directory that stores attributes or parameters of application 704 (e.g., TCP ports used thereby). Selecting the characteristic file may also involve searching the selected directory for files of a predetermined type (e.g., XML files) or files named according to one or more patterns (e.g., files including in the names thereof the word "server"), among other possibilities. Data regarding the directories and files used in selecting the characteristic file may be transmitted to discovery application 740 at arrow 712.

In one example, application 704 may represent a web container application such as APACHE TOMCAT®. The web container may be configured to execute therein web applications that provide dynamic (e.g., user-specific) web content by way of corresponding servlets (e.g., hypertext transfer protocol servlets). The servlets may be JAVA® servlets configured to execute on a corresponding server device and may be implemented according specifications of the JAVA® Enterprise Edition.

In this case, the characteristic file may be a "server.xml" file associated with and stored in an install directory of the web container application. Although this file may be configured to have a different name on different computing devices (e.g., according to user preference, release version, etc.), the file may contain attributes, configurations, and other parameters that may be used to classify the web container application using ML classifier 608. Notably, however, due to the differences in naming of this file or different arrangement of the contents of this file among different installations of the web container application, a discovery pattern might fail to classify the web container application. While it may be possible to define a discovery pattern that will detect this particular variant of the web container application, such an approach might be impractical due to the number of variants of this file, the rate at which variants are modified, and/or the amount of effort required to define and modify the discovery pattern.

Additionally, in the case of a web container application configured to execute therein other software applications, the characteristic files of the web container application may include files associated with the other software applications. Namely, when a particular application of the applications executing within the web container needs the web container or a specific version thereof in order to execute, a characteristic file that identifies the particular application also indirectly identifies the web container in which the particular application is executing. In such or similar cases, classifying the particular application may also result in indirect classification of the web container application.

Returning to FIG. 7, in response to or based on selecting the characteristic file, discovery application 740 may be configured to transmit, to computing device 702, a request for the selected characteristic file, as indicated by allow 718. In response or based on this request, computing device 702 may be configured to retrieve and transmit the characteristic file to discovery application 740, as indicated by arrow 720. In response to or based on receiving the characteristic file, discovery application 740 may be configured to transmit a request for classification of application 704 to ML classifier 608, as indicated by arrow 722. The request at arrow 722 may include the characteristic file.

ML classifier 608 may be configured to, in response to or based on receiving the request at arrow 722, classify application 704 based on the characteristic file, as indicated by block 724. As previously discussed, ML classifier 608 may be configured to classify application 704 into one of a plurality of predetermined categories, the number and specificity of which may vary between different implementations. In some examples, ML classifier 608 may be configured to generate a confidence metric indicating how strongly the characteristic file indicates a particular category.

In response to or based on classifying application 704 at block 724, ML classifier 608 may be configured to transmit, to discovery application 740, data indicating the classification, as indicated by arrow 726. This data may include, for example, the confidence metric associated with each category. The confidence metric may represent the likelihood that application 704 has been accurately classified based on the characteristic file. In one example, the data may include the top three categories having the highest confidence metrics associated therewith.

Based on or in response to receiving the classification data at arrow 726, discovery application 740 may be configured to modify the configuration item to include the classification of application 704. In one example, the configuration item may be modified when the value of the confidence metric associated with the most likely category for application 704 exceeds a threshold value (e.g., 50%, 60%, 75%, etc.). In another example, the configuration item may be modified to reflect the most likely classification of application 704 regardless of the value of the confidence metric (since other classifications might not be available). Notably, the configuration item may be modified to include the confidence metric, thereby allowing future processes that use the configuration item to account for the likelihood that application 704 has been correctly classified.

Additionally, in some implementations, discovery application 740 may identify any configuration items with confidence metric values below a particular threshold and may provide for these configuration items to be manually modified. Notably, by using ML classifier 608, the number of unclassified or inaccurately classified applications may be reduced. Additionally, by storing the confidence metric, the manual classification workload may be easily managed by varying the threshold confidence value below which an application is to be manually verified or reclassified.

In response to or based on modifying the configuration item at block 728, discovery application 740 may be configured to transmit, to database 700, a request to store the configuration item as modified in database 700, as indicated by arrow 730. Database 700 may be referred to as a configuration management database in that it stores configuration items for managed network 300. In response to or based on receiving the request at arrow 730, database 700 may be configured to store therein the configuration item as modified, as indicated by block 732.

Notably, additional configuration items that indicate the relationships between application 704 and other computing devices and software applications within managed network 300 may be generated by discovery application 740 and stored in database 700. Other computing devices may access database 700 and use the configuration items stored therein to display a visual representation of the configuration items within managed network 300.

Notably, the process illustrated in FIG. 7, or at least portions thereof, may be carried out sequentially as software applications are discovered on computing devices within managed network 300. By performing the process sequentially, ML classifier 608 may be provided with an approximately steady or periodic workload that allows a given application to be classified before other application are discovered (and thus impose additional computing workload on ML classifier 608). In contrast, while carrying out this discovery process for multiple discovered applications in parallel may be possible, it may impose a large workload on ML classifier 608 during a small time period, rather than distributing this workload over time.

Additionally, although ML classifier 608 may primarily rely on the characteristic file to classify software applications, in some implementations ML classifier 608 may additionally be trained to take as input other information. For example, an application may initially be discovered by commanding an operating system of a computing device to indicate a list of software processes executing thereon. The operating system may also be configured to indicate various additional attributes for each process such as, for example, the command used to invoke the execution of the process, a working directory of the process, a user under whose account the process is executing, and a process identifier, among other attributes. ML classifier 608 may be configured to generate the classification of a discovered application further based on such additional attributes of the software processes corresponding thereto.

VIII. EXAMPLE MAPPING AND SELECTION OF ML CLASSIFIERS

Figure 8:
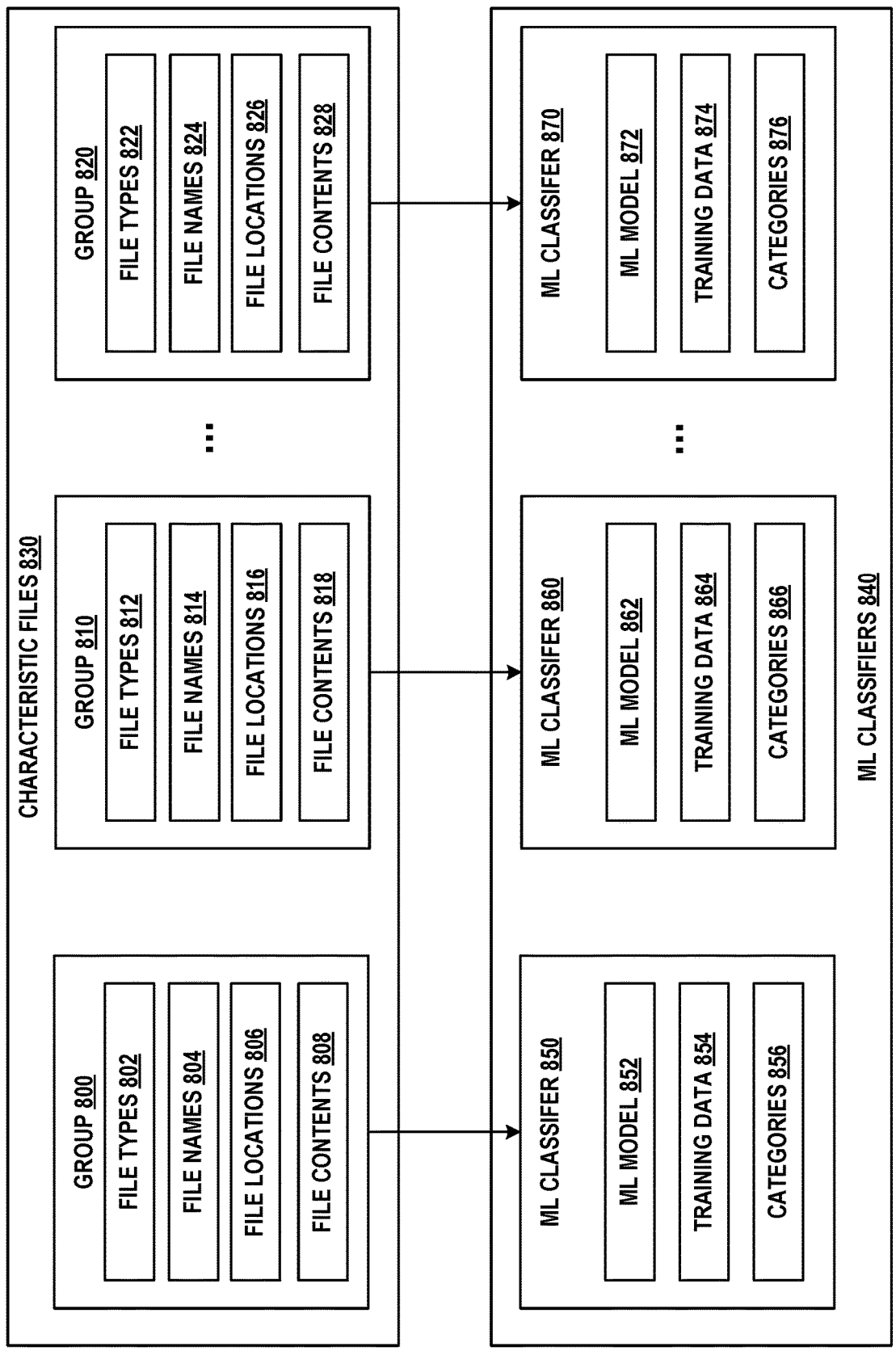
FIG. 8 depicts a mapping between groups of characteristic files and machine learning classifiers, in accordance with example embodiments.

FIG. 8 illustrates an example mapping between groups of characteristic files and ML classifiers that may be used to select an ML classifier based on attributes or properties of a given characteristic file. Namely, in some examples, rather than implementing a single ML classifier capable of classifying each of a target number of software applications, multiple ML classifiers may be trained instead, with each ML classifier corresponding to a different characteristic file group having corresponding attributes or properties.

For example, characteristic files 830 used to train the different ML classifiers may be divided into groups 800, 810, and 820 (with the ellipsis indicating other possible groups). Each of groups 800, 810, and 820 may be associated with corresponding file types, file names, file locations, and file contents. Namely, group 800 may be associated with file types 802 (e.g., .XML), file names 804 (e.g., names that include "server" or "social"), file locations 806, and file contents 808. Similarly, group 810 may be associated with file types 812, file names 814, file locations 816, and file contents 818. Finally, group 820 may be associated with file types 822, file names 824, file locations 826, and file contents 828.

Such grouping of characteristic files may allow the discovery application to distinguish characteristic files that may be used to classify a discovered application from other files that do not contain information needed for classification. Specifically, the groupings shown in FIG. 8 define the different attributes or properties for which the discovery application searches in order to identify and select the characteristic file of a discovered (but unclassified) software application. Additionally, these groupings of characteristic files allows for selection of a corresponding ML classifier likely to be well-suited (e.g., specifically trained) for classifying characteristic files having attributes or properties similar to those of the selected characteristic file. Notably, by using an ML classifier targeted toward a particular group of characteristic files, the ML classifier may be simplified and may thus result in a faster classification process.

Multiple ML classifiers 840 may be available for selection by the discovery application. For example, ML classifier 850 may implement ML model 852 (e.g., a naïve Bayes model or an artificial neural network), be trained using training data 854, and be configured to classify applications among categories 856. Notably, training data 854 may indicate, among other things, the number of samples used to train ML model 852 and therefore its reliability in making predictions. Similarly, ML classifier 860 may implement ML model 862, be trained using training data 864, and be configured to classify applications among categories 866. Finally, ML classifier 870 may implement ML model 872, be trained using training data 874, and be configured to classify applications among categories 876.

Each respective group of characteristic files may be mapped or assigned to a corresponding ML classifier that is configured to classify files having attributes similar to those of the respective group. Thus, group 800 may be mapped to ML classifier 850, group 810 may be mapped to ML classifier 860, and group 820 may be mapped to ML classifier 870. When a characteristic file is selected by the discovery application, its attributes may be compared to the attributes (e.g., file type, name, location, and/or contents) of groups 800, 810, and 820. The group whose attributes most closely match the attributes of the selected characteristic file may be selected (e.g., based on determining a weighted sum of the different attributes) and therefore this group's corresponding ML classifier may be used to classify the discovered software application.

In some implementations, such as when a characteristic file could belong to more than one of groups 800, 810, and 820, the characteristic file could be provided for classification by multiple ML classifiers. In such cases, the discovery application may classify the discovered application based on the confidence values produced by each ML classifier. Namely, the discovery application may classify the discovered application according to the category having the highest confidence value across all ML classifiers used to carry out the classification.

IX. EXAMPLE OPERATIONS

Figure 9:
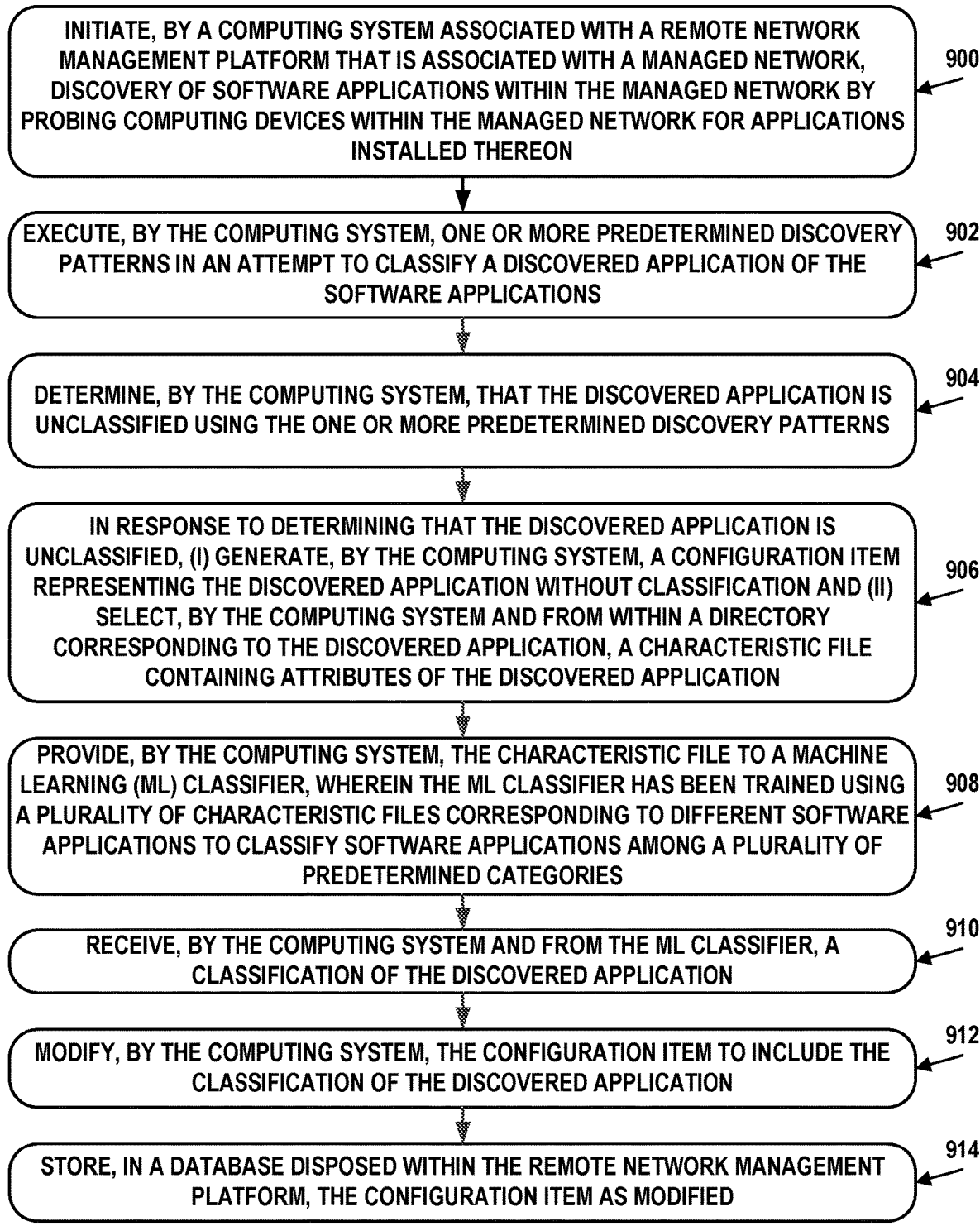
FIG. 9 is a flow chart, in accordance with example embodiments.

FIG. 9 is a flow chart illustrating an example embodiment. The process illustrated by FIG. 9 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device. In another example, the process can be carried out by a discovery application that may be distributed among one or more computing devices within remote network management platform 320 and/or managed network 300.

The embodiments of FIG. 9 may be simplified by the removal of any one or more of the features shown therein. Further, these embodiments may be combined with features, aspects, and/or implementations of any of the previous figures or otherwise described herein.

Block 900 involves initiating, by a computing system associated with a remote network management platform that is associated with a managed network, discovery of software applications within the managed network by probing computing devices within the managed network for applications installed thereon.

Block 902 involves executing, by the computing system, one or more predetermined discovery patterns in an attempt to classify a discovered application of the software applications.

Block 904 involves determining, by the computing system, that the discovered application is unclassified after executing the one or more predetermined discovery patterns.

Block 906 involves, in response to determining that the discovered application is unclassified, (i) generating, by the computing system, a configuration item representing the discovered application without classification and (ii) selecting, by the computing system and from within a directory corresponding to the discovered application, a characteristic file containing attributes of the discovered application.

Block 908 involves providing, by the computing system, the characteristic file to a machine learning (ML) classifier. The ML classifier has been trained using a plurality of characteristic files corresponding to different software applications to classify software applications among a plurality of predetermined categories.

Block 910 involves receiving, by the computing system and from the ML classifier, a classification of the discovered application.

Block 912 involves modifying, by the computing system, the configuration item to include the classification of the discovered application.

Block 914 involves storing, in a database disposed within the remote network management platform, the configuration item as modified.

In some embodiments, selecting the characteristic file may involve searching the directory corresponding to the discovered application for files of a predetermined type.

In some embodiments, selecting the characteristic file may involve searching the directory corresponding to the discovered application for files named according to one or more predetermined patterns.

In some embodiments, the ML classifier may be selected by the computing system from a plurality of candidate ML classifiers based on the attributes of the discovered application contained in the characteristic file.

In some embodiments, the plurality of predetermined categories may represent different types of software applications.

In some embodiments, the plurality of predetermined categories may represent different versions of the discovered application.

In some embodiments, the characteristic file may be a configuration file of the discovered application that defines a plurality of parameters according to which the discovered application is configured to operate.

In some embodiments, determining that the discovered application is unclassified using the one or more predetermined discovery patterns may involve determining additional attributes of the discovered application based on at least one of (i) one or more files within the directory corresponding to the discovered application or (ii) parameters of one or more executing software processes corresponding to the discovered application. Based on the additional attributes, the computing system may determine that a discovery pattern corresponding to the discovered application is not specified by the one or more predetermined discovery patterns.

In some embodiments, the ML classifier may be configured to generate a confidence metric associated with the classification of the discovered application. Modifying the configuration item to include the classification of the discovered application may involve receiving, from the ML classifier, the confidence metric associated with the classification of the discovered application and determining that the confidence metric exceeds a threshold confidence value. The configuration item may be modified based on the confidence metric exceeding the threshold confidence value.

In some embodiments, the discovered application may be a web container (e.g., APACHE TOMCAT®) executing on a server device within the managed network. The web container may be configured to execute therein web applications each configured to provide dynamic web content by way of a corresponding servlet. The characteristic file may include a plurality of application files corresponding to the web applications. The ML classifier may be configured to classify the web container based on the plurality of application files.

In some embodiments, data used to train the ML classifier may indicate, for each respective software application of the different software applications, a mapping between a respective predetermined category of the plurality of predetermined categories and a respective characteristic file. A portion of the data may be obtained from a plurality of different managed networks associated with the remote network management platform.

In some embodiments, the ML classifier may be further trained using a plurality of commands used to invoke execution of the different software applications to classify the different software applications among the plurality of predetermined categories. The computing system may determine a command used to invoke execution of the discovered application based on one or more executing software processes corresponding to the discovered application. The computing system may provide the command to the ML classifier and receive, from the ML classifier, the classification of the discovered application. The classification may be additionally based on the command.

In some embodiments, selecting the characteristic file may involve transmitting, by the computing system and to a computing device on which the discovered application is executing, a command configured to cause the computing device to identify software processes executing on the computing device. The computing system may also receive, from the computing device, first data indicating the software processes executing on the computing device. The computing system may additionally identify, based on the first data, the discovered application and transmit, to the computing device, one or more additional commands configured to cause the computing device to (i) identify the directory corresponding to the discovered application and (ii) one or more files contained in the directory. The computing system may further receive, from the computing device, second data indicating (i) the directory and (ii) the one or more files. The characteristic file may be selected based on the second data.

X. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computing system comprising:
a database disposed within a computational instance of a remote network management platform, wherein the database is stored on a memory, wherein the computational instance is associated with a managed network, and wherein the managed network comprises software applications installed on computing devices; and
a discovery application configured to:
initiate discovery of the software applications within the managed network by probing the computing devices for applications configured to execute thereon;
execute one or more predetermined discovery patterns in an attempt to classify a discovered application of the software applications;
determine that the discovered application is unclassified after executing the one or more predetermined discovery patterns;
in response to determining that the discovered application is unclassified, (i) generate a configuration item representing the discovered application without classification and (ii) select, from within a directory corresponding to the discovered application, a characteristic file containing attributes of the discovered application;
determine a command used to invoke execution of the discovered application based on one or more executing software processes corresponding to the discovered application;

provide the characteristic file and the command to a machine learning (ML) classifier, wherein the ML classifier has been trained using:
- a plurality of characteristic files corresponding to different software applications to classify the different software applications among a plurality of predetermined categories; and
- a plurality of commands used to invoke execution of the different software applications to classify the different software applications among the plurality of predetermined categories;

receive, from the ML classifier, a classification of the discovered application, wherein the classification is based on the characteristic file and the command;

modify the configuration item to include the classification of the discovered application; and store, in the database, the configuration item as modified.

2. The computing system of claim 1, wherein the discovery application is configured to select the characteristic file by:
searching the directory corresponding to the discovered application for files of a predetermined type.

3. The computing system of claim 1, wherein the discovery application is configured to select the characteristic file by:
searching the directory corresponding to the discovered application for files named according to one or more predetermined patterns.

4. The computing system of claim 1, wherein the discovery application is configured to:
select the ML classifier from a plurality of candidate ML classifiers based on the attributes of the discovered application contained in the characteristic file.

5. The computing system of claim 1, wherein the plurality of predetermined categories represent different types of software applications.

6. The computing system of claim 1, wherein the plurality of predetermined categories represent different versions of the discovered application.

7. The computing system of claim 1, wherein the characteristic file is a configuration file of the discovered application that defines a plurality of parameters according to which the discovered application is configured to operate.

8. The computing system of claim 1, wherein the discovery application is configured to determine that the discovered application is unclassified after executing the one or more predetermined discovery patterns by:
determining additional attributes of the discovered application based on at least one of (i) one or more files within the directory corresponding to the discovered application or (ii) parameters of the one or more executing software processes corresponding to the discovered application; and
determining, based on the additional attributes, that a discovery pattern corresponding to the discovered application is not specified by the one or more predetermined discovery patterns.

9. The computing system of claim 1, wherein the ML classifier is configured to generate a confidence metric associated with the classification of the discovered application, and wherein the discovery application is configured to modify the configuration item to include the classification of the discovered application by:
receiving, from the ML classifier, the confidence metric associated with the classification of the discovered application; and
determining that the confidence metric exceeds a threshold confidence value, wherein the configuration item is modified based on the confidence metric exceeding the threshold confidence value.

10. The computing system of claim 1, wherein data used to train the ML classifier indicates, for each respective software application of the different software applications, a mapping between a respective predetermined category of the plurality of predetermined categories and a respective characteristic file, wherein a portion of the data is obtained from a plurality of different managed networks associated with the remote network management platform.

11. The computing system of claim 1, wherein the discovery application is configured to select the characteristic file by:
transmitting, to a computing device on which the discovered application is executing, a command configured to cause the computing device to identify the one or more executing software processes executing on the computing device;
receiving, from the computing device, first data indicating the one or more executing software processes executing on the computing device;
identifying, based on the first data, the discovered application;
transmitting, to the computing device, one or more additional commands configured to cause the computing device to (i) identify the directory corresponding to the discovered application and (ii) one or more files contained in the directory; and
receiving, from the computing device, second data indicating (i) the directory and (ii) the one or more files, wherein the characteristic file is selected based on the second data.

12. The computing system of claim 1, wherein the ML classifier executes exclusively on one machine.

13. A computing system comprising:
a database disposed within a computational instance of a remote network management platform, wherein the database is stored on a memory, wherein the computational instance is associated with a managed network, and wherein the managed network comprises software applications installed on computing devices; and
a discovery application configured to:
initiate discovery of the software applications within the managed network by probing the computing devices for applications configured to execute thereon;
execute one or more predetermined discovery patterns in an attempt to classify a discovered application of the software applications, wherein the discovered application is a web container executing on a server device within the managed network, wherein the web container is configured to execute therein web applications each configured to provide dynamic web content by way of a corresponding servlet;
determine that the discovered application is unclassified after executing the one or more predetermined discovery patterns;
in response to determining that the discovered application is unclassified, (i) generate a configuration item representing the discovered application without classification and (ii) select, from within a directory corresponding to the discovered application, a characteristic file containing attributes of the discovered application, wherein the characteristic file comprises a plurality of application files corresponding to the web applications;

provide the characteristic file to a machine learning (ML) classifier, wherein the ML classifier has been trained using a plurality of characteristic files corresponding to different software applications to classify the different software applications among a plurality of predetermined categories, wherein the ML classifier is configured to classify the web container based on the plurality of application files;

receive, from the ML classifier, a classification of the discovered application;

modify the configuration item to include the classification of the discovered application; and store, in the database, the configuration item as modified.

14. A method comprising:

initiating, by a computing system associated with a remote network management platform that is associated with a managed network, discovery of software applications within the managed network by probing computing devices within the managed network for applications installed thereon;

executing, by the computing system, one or more predetermined discovery patterns in an attempt to classify a discovered application of the software applications;

determining, by the computing system, that the discovered application is unclassified after executing the one or more predetermined discovery patterns;

in response to determining that the discovered application is unclassified, (i) generating, by the computing system, a configuration item representing the discovered application without classification and (ii) selecting, by the computing system and from within a directory corresponding to the discovered application, a characteristic file containing attributes of the discovered application;

determining, by the computing system, a command used to invoke execution of the discovered application based on one or more executing software processes corresponding to the discovered application;

providing, by the computing system, the characteristic file and the command to a machine learning (ML) classifier, wherein the ML classifier has been trained using:
  a plurality of characteristic files corresponding to different software applications to classify software applications among a plurality of predetermined categories; and
  a plurality of commands used to invoke execution of the different software applications to classify the different software applications among the plurality of predetermined categories;

receiving, by the computing system and from the ML classifier, a classification of the discovered application, wherein the classification is based on the characteristic file and the command;

modifying, by the computing system, the configuration item to include the classification of the discovered application; and storing, in a database disposed within the remote network management platform, the configuration item as modified.

15. The method of claim 14, wherein the characteristic file is a configuration file of the discovered application that defines a plurality of parameters according to which the discovered application is configured to operate.

16. The method of claim 14, wherein determining that the discovered application is unclassified using the one or more predetermined discovery patterns comprises:

determining additional attributes of the discovered application based on at least one of (i) one or more files within the directory corresponding to the discovered application or (ii) parameters of the one or more executing software processes corresponding to the discovered application; and determining, based on the additional attributes, that a discovery pattern corresponding to the discovered application is not specified by the one or more predetermined discovery patterns.

17. The method of claim 14, wherein data used to train the ML classifier indicates, for each respective software application of the different software applications, a mapping between a respective predetermined category of the plurality of predetermined categories and a respective characteristic file, wherein a portion of the data is obtained from a plurality of different managed networks associated with the remote network management platform.

18. The method of claim 14, wherein the ML classifier executes exclusively on one machine.

19. An article of manufacture including a non-transitory computer-readable medium, having stored thereon program instructions that, upon execution by a computing system, cause the computing system to perform operations comprising:

initiating discovery of software applications within a managed network that is associated with a remote network management platform by probing computing devices within the managed network for applications installed thereon;

executing one or more predetermined discovery patterns in an attempt to classify a discovered application of the software applications;

determining that the discovered application is unclassified after executing the one or more predetermined discovery patterns;

in response to determining that the discovered application is unclassified, (i) generating a configuration item representing the discovered application without classification and (ii) selecting, from within a directory corresponding to the discovered application, a characteristic file containing attributes of the discovered application;

determining a command used to invoke execution of the discovered application based on one or more executing software processes corresponding to the discovered application;

providing the characteristic file and the command to a machine learning (ML) classifier, wherein the ML classifier has been trained using:
  a plurality of characteristic files corresponding to different software applications to classify software applications among a plurality of predetermined categories; and
  a plurality of commands used to invoke execution of the different software applications to classify the different software applications among the plurality of predetermined categories;

receiving, from the ML classifier, a classification of the discovered application, wherein the classification is based on the characteristic file and the command;

modifying the configuration item to include the classification of the discovered application; and storing, in a database disposed within the remote network management platform, the configuration item as modified.

20. The article of manufacture of claim 19, wherein the ML classifier executes exclusively on one machine.

* * * * *